United States Patent
Ma et al.

(10) Patent No.: US 11,249,333 B2
(45) Date of Patent: Feb. 15, 2022

(54) OPTICAL PROCESSING APPARATUS AND NEAR-EYE DISPLAY DEVICE

(71) Applicants: BEIJING BOE OPTOELECTRONICS TECHNOLOGY CO., LTD., Beijing (CN); BOE TECHNOLOGY GROUP CO., LTD., Beijing (CN)

(72) Inventors: Zhanshan Ma, Beijing (CN); Wenhong Tian, Beijing (CN); Hao Zhang, Beijing (CN); Lili Chen, Beijing (CN)

(73) Assignees: BEIJING BOE OPTOELECTRONICS TECHNOLOGY CO., LTD., Beijing (CN); BOE TECHNOLOGY GROUP CO., LTD., Beijing (CN)

(*) Notice: Subject to any disclaimer, the term of this patent is extended or adjusted under 35 U.S.C. 154(b) by 0 days.

(21) Appl. No.: 16/759,728

(22) PCT Filed: Sep. 3, 2019

(86) PCT No.: PCT/CN2019/104206
§ 371 (c)(1),
(2) Date: Apr. 27, 2020

(87) PCT Pub. No.: WO2020/063273
PCT Pub. Date: Apr. 2, 2020

(65) Prior Publication Data
US 2021/0181555 A1    Jun. 17, 2021

(30) Foreign Application Priority Data

Sep. 30, 2018 (CN) .......................... 201811157148.0

(51) Int. Cl.
*G02F 1/1335* (2006.01)
*G02F 1/1333* (2006.01)
(Continued)

(52) U.S. Cl.
CPC .... *G02F 1/13318* (2013.01); *G02F 1/133526* (2013.01); *G02F 1/13332* (2021.01);
(Continued)

(58) Field of Classification Search
None
See application file for complete search history.

(56) References Cited

U.S. PATENT DOCUMENTS

2017/0007116 A1*  1/2017 Samec .................. A61B 3/024

FOREIGN PATENT DOCUMENTS

CN    204166195 U    2/2015
CN    105700142 A    6/2016
(Continued)

OTHER PUBLICATIONS

Translation of CN106019589 (Year: 2016).*
(Continued)

*Primary Examiner* — Phu Vu
(74) *Attorney, Agent, or Firm* — Nath, Goldberg & Meyer; Joshua B. Goldberg (57) ABSTRACT

The present disclosure provides an optical processing apparatus, including at least one optical lens group, light transmittance of which is adjustable; a photodetector configured to detect an intensity of light emitted to the optical lens group; and a controller configured to adjust the light transmittance of the optical lens group according to the light intensity detected by the photodetector.

18 Claims, 4 Drawing Sheets

(51) Int. Cl.
*G02F 1/13357* (2006.01)
*G02F 1/133* (2006.01)

(52) U.S. Cl.
CPC .. *G02F 1/133562* (2021.01); *G02F 1/133567* (2021.01); *G02F 1/133602* (2013.01)

(56) References Cited

FOREIGN PATENT DOCUMENTS

| | | |
|---|---|---|
| CN | 106019589 A | 10/2016 |
| CN | 106990534 A | 7/2017 |
| CN | 207529030 U | 6/2018 |
| JP | 2002268002 A | 9/2002 |
| KR | 20120081464 A | 7/2012 |
| KR | 101783800 B1 | 10/2017 |

OTHER PUBLICATIONS

Translation of KR1020120081464 (Year: 2012).*
First Office Action dated Jul. 23, 2020, for corresponding Chinese application 201811157148.0.

* cited by examiner

OPTICAL PROCESSING APPARATUS AND NEAR-EYE DISPLAY DEVICE

This is a National Phase Application filed under 35 U.S.C. 371 as a national stage of PCT/CN2019/104206, filed Sep. 3, 2019, an application claiming the benefit of Chinese Application No. 201811157148.0, filed Sep. 30, 2018, the content of each of which is hereby incorporated by reference in its entirety.

TECHNICAL FIELD

The present disclosure relates to the field of display technology, and in particular, to an optical processing apparatus and a near-eye display device.

BACKGROUND

With the development of science and technology, Virtual Reality (VR) display technology has gradually come into people's sight, and virtual reality devices can provide immersive visual experience for wearers. In a virtual reality device, light from a display screen is projected to human eyes through an optical lens, so that a user can see a displayed image. However, in current virtual reality devices, brightness of the display screen varies when the display screen displays different images, and the human eyes are very close to the display screen, so that the human eyes are strongly stimulated when the display screen displays a high-brightness image; thereby affecting user experience.

SUMMARY

The present disclosure has been made to at least partially solve the technical problems existing in the related art, and provides an optical processing apparatus and a near-eye display device, which can prevent users' eyes from being strongly stimulated by adjusting light transmittance.

According to an aspect of the present disclosure, an optical processing apparatus is provided, and includes:

at least one optical lens group, light transmittance of which is adjustable;

a photodetector configured to detect intensity of light emitted to the optical lens group; and a controller configured to adjust the light transmittance of the optical lens group according to the light intensity detected by the photodetector.

In some embodiments, each optical lens group includes a light-transmissive layer, and one convex lens or a plurality of coaxially arranged convex lenses configured to converge light from a light incident side of the optical lens group, the light-transmissive layer covers the convex lenses in a direction of a main optical axis of the convex lenses, and the light transmittance of the light-transmissive layer is adjustable.

In some embodiments, the light-transmissive layer includes a liquid crystal layer and a transparent driving electrode layer, and the controller is configured to control a power supply to supply a driving voltage to the driving electrode layer, so as to generate an electric field for driving a liquid crystal in the liquid crystal layer to deflect.

In some embodiments, the controller is configured to control the power supply to supply the driving electrode layer with a driving voltage corresponding to the light intensity detected by the photodetector according to a preset correspondence, the correspondence including a correspondence between different light intensities and corresponding driving voltages.

In some embodiments, the driving electrode layer includes two transparent electrode layers disposed opposite to each other, and the liquid crystal layer is located between the two transparent electrode layers.

In some embodiments, each optical lens group includes two convex lenses, and the light-transmissive layer is disposed between the two convex lenses.

In some embodiments, the two convex lenses of each optical lens group are both plano-convex lenses, and a flat surface of the plano-convex lens is attached to the light-transmissive layer.

In some embodiments, the light-transmissive layer includes a liquid crystal layer and two transparent driving electrode layers sandwiching the liquid crystal layer, the driving electrode layers being made of indium tin oxide and formed on the flat surface of the plano-convex lens.

In some embodiments, each of the convex lenses is provided at the edge thereof with a fixing member, and the fixing member corresponding to one convex lens and the fixing member corresponding to the other convex lens are connected to each other to form the integrated optical lens group.

In some embodiments, there are a plurality of photodetectors, and the plurality of photodetectors surround the convex lens along the edge of the convex lens and are disposed on the fixing member.

In some embodiments, the number of the optical lens groups is two, and the plurality of photodetectors surround the convex lens of only one optical lens group along the edge of the convex lens.

According to the other aspect of the present disclosure, a near-eye display device is provided, and includes a display panel and the above optical processing apparatus, the display panel is disposed on a light incident side of the optical lens group, and the photodetector is configured to detect the intensity of the light emitted from the display panel to the optical lens group.

In some embodiments, the optical lens group is configured to converge the light from the display panel to a viewing area opposite to the display panel.

In some embodiments, the intensity of the light emitted from the optical lens group to the light emitting side thereof is within a preset range.

In some embodiments, the near-eye display device further includes a housing, and the housing includes a side wall; a first mounting portion that is connected to one end of the side wall, surrounds the optical lens group, and faces the display panel; and a second mounting portion that is connected to the other end of the side wall and surrounds the display panel.

In some embodiments, the photodetector is disposed on a surface of the first mounting portion facing the display panel.

In some embodiments, the optical lens group is connected to the first mounting portion through a fixing member.

In some embodiments, the display panel is disposed on the second mounting portion.

In some embodiments, the number of the optical lens groups is two, and the housing further includes a light shielding plate disposed between the two optical lens groups.

In some embodiments, a plurality of photodetectors are arranged around the optical lens group in a plane parallel to the display panel.

BRIEF DESCRIPTION OF THE DRAWINGS

The accompanying drawings are used to provide a further understanding of the present disclosure, constitute a part of specification, and explain the present disclosure with the following specific embodiments, but do not constitute a limitation on the present disclosure. In the drawings.

DETAILED DESCRIPTION

Exemplary embodiments of the present disclosure are described in detail below with reference to the accompanying drawings. It should be understood that the exemplary embodiments described herein are only for illustrating and explaining the present disclosure, and are not intended to limit the present disclosure.

Figure 1:
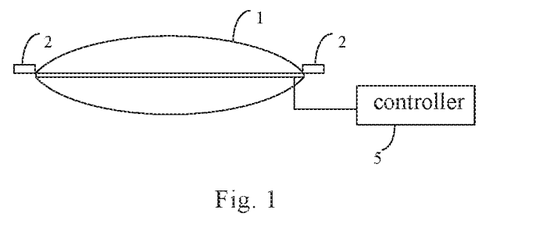
FIG. 1 is a schematic diagram illustrating an overall structure of an optical processing apparatus according to the exemplary embodiments of the present disclosure.

According to one aspect of the present disclosure, an optical processing apparatus is provided. FIG. 1 is a schematic diagram illustrating an overall structure of an optical processing apparatus according to the exemplary embodiments of the present disclosure. As shown in FIG. 1, the optical processing apparatus capable of being used in a virtual reality device includes a photodetector 2, a controller 5 and at least one optical lens group 1, light transmittance of which is adjustable. The photodetector 2 is configured to detect an intensity of light emitted to the optical lens group 1. The controller 5 is configured to adjust the light transmittance of the optical lens group 1 according to the light intensity detected by the photodetector 2.

By detecting the light intensity by the photodetector 2 and adjusting the light transmittance of the optical lens group 1 by the controller 5, the light transmittance of the optical lens group 1 can be adjusted to a relatively small value under a condition that the intensity of the light emitted to the optical lens group 1 is too large; and the light transmittance of the optical lens group 1 can be adjusted to a relatively large value under a condition that the intensity of the light emitted to the optical lens group 1 is too small, thereby ensuring that light received on the other side of the optical lens group 1 can be maintained within a required range. In this way, when a user watches displayed images of a display panel, the optical lens group 1 may be disposed between eyes and the display panel, so that the intensity of light emitted to the eyes is not too large, thereby protecting the eyes.

In the exemplary embodiments of the present disclosure, the controller 5 may be implemented by a central processing unit, an application specific integrated circuit, a microprocessor, a DSP chip, or an embedded chip. However, the controller 5 of the present disclosure is not limited thereto, and may be any other apparatus or control circuit capable of implementing signal input and output.

In the exemplary embodiments of the present disclosure, the optical lens group 1 may be specifically a lens group that functions to converge light, or a lens group that functions to diverge light.

The optical processing apparatus is particularly suitable for being used in a near-eye display device, which may be a head-mounted virtual reality (VR) device, or a non-head-mounted virtual reality device placed on a support for a user to watch images within a short distance. The optical processing apparatus may be used in conjunction with a display panel of a near-eye display device to enable the user to see a realistic stereoscopic image. In this case, the optical lens group 1 is a lens group that functions to converge light.

Figure 2A:
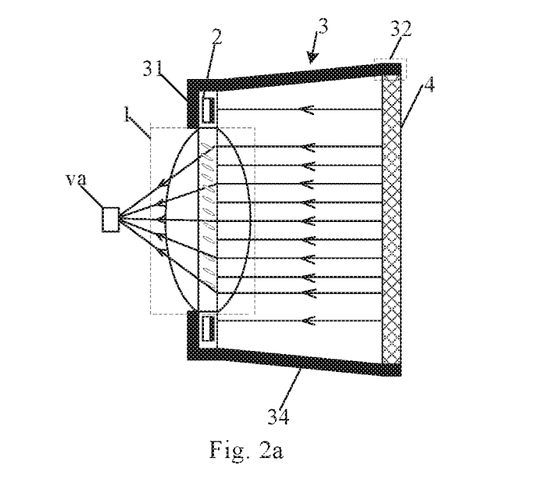
FIG. 2a to FIG. 2c are side views of an optical processing apparatus when being used in conjunction with a display panel according to the exemplary embodiments of the present disclosure.

FIG. 2a is a side view of an optical processing apparatus when being used in conjunction with a display panel according to an exemplary embodiment of the present disclosure. As shown in FIG. 2a, when the optical processing apparatus is used in a near-eye display device, a display panel 4 is located on a light incident side of the optical lens group 1, and the optical lens group 1 diverges at least part of light emitted by the display panel 4 to a viewing area va located on a light emitting side (i.e., a side away from the display panel 4). The viewing area va is a position at which the optical lens group 1 converges the light emitted by the display panel 4, and in which human eyes can clearly see a displayed image of the display panel 4.

The photodetector 2 may be, for example, a photosensitive sensor, and may be electrically connected to the controller 5 through a flexible circuit board. The controller 5 is configured to adjust the light transmittance of the optical lens group 1 according to the light intensity detected by the photodetector 2, and to make the intensity of the light emitted from the optical lens group 1 to the viewing area va within a preset range. The preset range may be determined according to the sensitivity of human eyes to light, so that the light with a light intensity within the preset range causes little stimulation to the human eyes when being irradiated to the human eyes, which makes the user feel comfortable.

In FIG. 2a, when the intensity of the light emitted from the display panel 4 of the near-eye display device to the optical lens group 1 is too large, the controller 5 can adjust the light transmittance of the optical lens group 1 to maintain the intensity of the light emitted from the optical lens group 1 to the viewing area within the preset range suitable for human eyes, so as to protect the eyes and improve viewers' comfort.

Figure 3:
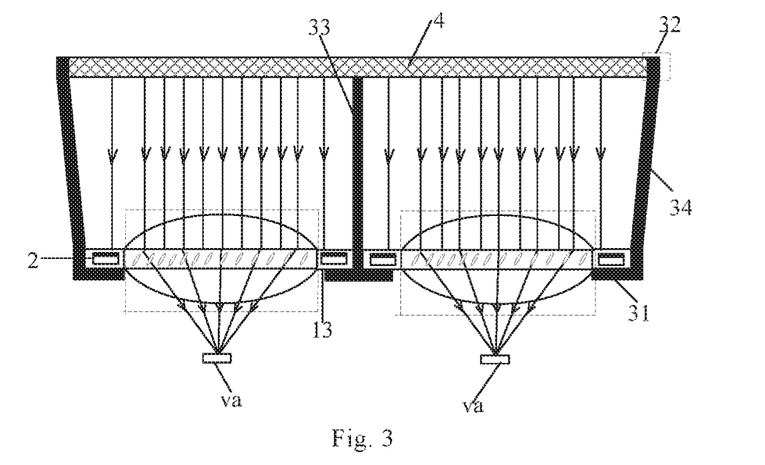
FIG. 3 is a top view of an optical processing apparatus when being used in conjunction with a display panel according to the exemplary embodiments of the present disclosure.

FIG. 3 is a top view of an optical processing apparatus when being used in conjunction with a display panel according to the exemplary embodiments of the present disclosure. As shown in FIG. 3, the number of the optical lens groups 1 is two, and two viewing areas va of the two optical lens groups 1 are corresponding to two eyes of a user respectively. The display panel 4 displays a left eye image and a right eye image simultaneously, and light from the left eye image and light from the right eye image are converged at the two viewing areas through the two optical lens groups 1 respectively, so that the user' eyes can respectively see the left eye image and the right eye image, which are then synthesized in the brain to form a stereoscopic image.

Figure 4:
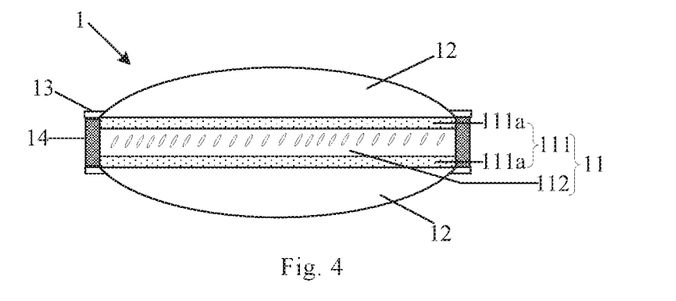
FIG. 4 is a schematic structural diagram of an optical lens group according to the exemplary embodiments of the present disclosure.

FIG. 4 is a schematic structural diagram of an optical lens group according to the exemplary embodiments of the present disclosure. As shown in FIG. 4, the optical lens group 1 includes a light-transmissive layer 11 and a plurality of coaxially arranged convex lenses 12, and a positional relation between the plurality of coaxially arranged convex lenses 12 and refractive indexes of the plurality of coaxially arranged convex lenses 12 satisfy a condition that the light from the light incident side of the optical lens group 1 can be converged at the viewing area va. A light transmittance of the light-transmissive layer 11 is adjustable; and the light-transmissive layer 11 covers the convex lenses 12 in the direction of the main optical axes of the convex lenses 12; that is, an orthographic projection of the light-transmissive layer 11 on a plane perpendicular to the main optical axes of the convex lenses 12 covers orthographic projections of the convex lenses 12 on the same plane, so that intensities of the light converged at different positions of the convex lens 12 are uniformly changed when the light transmittance of the light-transmissive layer 11 is changed, thereby improving display uniformity of different positions of an image seen by human eyes.

In the exemplary embodiments of the present disclosure, coaxial arrangement means that the main optical axes of the plurality of convex lenses 12 are located on a same straight line. It should be understood by those skilled in the art that the convex lens 12 is a thick-centered thin-edged lens with at least one spherical surface; for a convex lens having two spherical surfaces, its main optical axis is a straight line determined by centers of the two spherical surfaces; and for a convex lens having one flat surface and one spherical surface, which can be equivalent to a convex lens having two spherical surfaces according to its optical characteristics, its main optical axis can be determined in the same manner as described above.

Specifically, the optical lens group 1 in an exemplary embodiment includes two convex lenses 12, and the light-transmissive layer 11 is disposed between the two convex lenses 12. The two convex lenses 12 of the optical lens group 1 are both plano-convex lenses, that is, one surface of the convex lens 12 is a flat surface, and the other surface of the convex lens 12 is a spherical surface. The flat surfaces of the plano-convex lenses are attached to the light-transmissive layer 11, and the two convex lenses 12 are the same in size and shape, so that the optical lens group 1 as a whole is equivalent to a convex lens having two spherical surfaces to ensure that the light passing through a same optical lens group 1 can be converged at a same viewing area va, and the structure of the optical lens group 1 is more compact to reduce the whole volume of the optical processing apparatus.

Figure 2B:
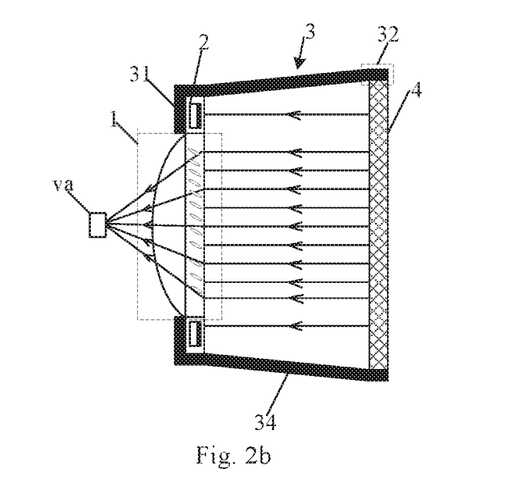

Of course, the number of the convex lens 12 in the optical lens group 1 may be one, that is, one of the convex lenses 12 in FIG. 4 is removed. In this way, as shown in FIG. 2b, it is possible to use only one convex lens 12 to converge at least part of the light emitted by the display panel 4 at the viewing area va.

As shown in FIG. 4, the light-transmissive layer 11 includes a liquid crystal layer 112 and a transparent driving electrode layer 111, and the controller 5 is configured to control a power supply to supply a driving voltage to the driving electrode layer 111 to generate an electric field for driving liquid crystals in the liquid crystal layer 112 to deflect. For example, when the liquid crystals in the liquid crystal layer 112 do not deflect (i.e., a deflection angle is 0°), a long axis of the liquid crystals is perpendicular to the main optical axis of the convex lens 12, and at the moment, a light transmittance of the liquid crystal layer 112 reaches a minimum value, which may be 0%; when the liquid crystals deflect at a maximum deflection angle, the long axis of the liquid crystal tends to be parallel to the main optical axis of the convex lens 12, and at the moment, the light transmittance of the liquid crystal layer 112 reaches a maximum value, which may be 96%; when the deflection angle of the liquid crystals is changed from 0° to the maximum deflection angle, the light transmittance of the liquid crystal layer 112 is accordingly changed from the minimum light transmittance to the maximum light transmittance. Therefore, the light transmittance of the light-transmissive layer 11 can be adjusted by adjusting the driving voltage applied to the driving electrode layer 111, so that the light transmittance of the light-transmissive layer 11 can be adjusted more conveniently and accurately. In the exemplary embodiments of the present disclosure, the controller 5 may be electrically connected to the driving electrode layer 111, and alternatively, the controller 5 may be wirelessly connected to the driving electrode layer 111 for the purpose of reducing wiring.

Figure 5A:
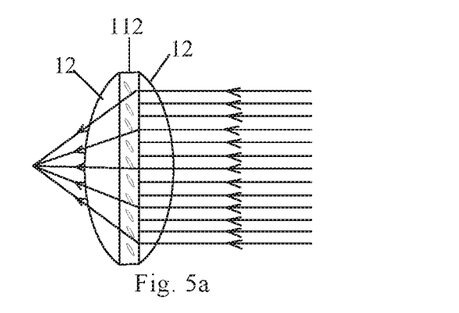
FIG. 5a and 5b are schematic diagrams illustrating distribution of light passing through an optical lens group when a light-transmissive layer has different light transmittances.
Figure 5B:
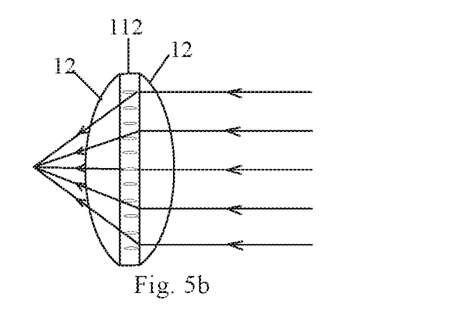

Specifically, when the light intensity detected by the photodetector 2 is relatively large, the controller 5 controls the power supply to supply a suitable driving voltage to the driving electrode layer 111, so as to enable the liquid crystals to deflect at a relatively small deflection angle, so that the optical lens group 1 as a whole has a relatively low light transmittance, as shown in FIG. 5a; that is, when the display panel displays a relatively bright image, the intensity of the light transmitted through the optical lens group 1 can be limited, thereby protecting human eyes. When the light intensity detected by the photodetector 2 is relatively small, the controller 5 controls the power supply to supply a suitable driving voltage to the driving electrode layer 111, so as to enable the liquid crystal to deflect at a relatively large deflection angle, so that the optical lens group 1 as a whole has a relatively high light transmittance, as shown in FIG. 5b; that is, when the display panel displays a relatively dark image, it is ensured that sufficient light enters human eyes to enable the user to clearly see the displayed image. The deflection angle of the liquid crystals is an angle between the long axis of the liquid crystals and a plane where the liquid crystal layer 112 is located.

In the exemplary embodiments of the present disclosure, the controller 5 is configured to control the power supply to supply the driving electrode layer 111 with a driving voltage corresponding to the light intensity detected by the photodetector 2 according to a preset correspondence, thereby controlling the light transmittance more accurately. The correspondence includes a correspondence between different light intensities and corresponding driving voltages. Specifically, the correspondence may include a relation between the deflection angles of the liquid crystals and the driving voltages, and a preset relation between the deflection angles of the liquid crystals and the light intensities detected by the photodetector 2. The relation between the deflection angles of the liquid crystals and the driving voltages may be obtained according to the characteristics of the liquid crystals; the relation between the deflection angles of the liquid crystals and the light intensities detected by the photodetector 2 may be preset according to a difference between a light intensity detected by the photodetector 2 and a target intensity within the preset range and a relation between the target intensity and the deflection angle of the liquid crystals, and it is determined that a maximum light intensity detected by the photodetector 2 is the intensity of emergent light when the display panel displays an image with L255.

For example, the preset range is 0~70 lux; the relation between the deflection angles of the liquid crystals and the light intensities detected by the photodetector 2 is: when the light intensity detected by the photodetector 2 is greater than 120 lux, the deflection angle of the liquid crystals is in a range of [30°, 45°] (that is, when the light intensity detected by the photodetector 2 is greater than 120 lux, the deflection angle of the liquid crystals needs to be set in the range of [30°, 45°] in order to maintain the intensity of the light irradiated to the viewing area within the preset range); when the light intensity detected by the photodetector 2 is in a range of [100 lux, 120 lux], the deflection angle of the liquid crystals is in a range of (45°, 60°]; when the light intensity detected by the photodetector 2 is in a range of [80 lux, 100 lux], the deflection angle of the liquid crystals is in a range of (60°, 75°]; when the light intensity detected by the photodetector 2 is in a range of [70 lux, 80 lux], the deflection angle of the liquid crystals is in a range of (75°, 85°]; and when the light intensity detected by the photodetector 2 is less than 70 lux, the deflection angle of the liquid crystals is 90°.

In such case, when the optical processing apparatus is used in the near-eye display device, assuming that the intensity of the light from the light incident side of the optical lens group 1 detected by the photodetector 2 is 100 lux, it is determined that the deflection angle of the liquid crystals corresponding to the light intensity of 100 lux is in the range of (45°, 60°], and then a driving voltage corresponding to the deflection angle of (45°, 60°] is further determined based on the relation between the deflection angles of the liquid crystals and the driving voltages, so that the optical lens group 1 as a whole can reach a relatively low light transmittance by controlling the liquid crystals to deflect, as shown in FIG. 5a, When the intensity of the light from the light incident side of the optical lens group 1 detected by the photodetector 2 is 50 lux, it is determined that the deflection angle of the liquid crystals corresponding to the light intensity of 50 lux is 90°, and then a driving voltage corresponding to the deflection angle of 90° is determined based on the relation between the deflection angles of the liquid crystals and the driving voltages, so that the optical lens group 1 as a whole reaches a relatively high light transmittance by controlling the liquid crystals to deflect, as shown in FIG. 5b.

As shown in FIG. 4, the driving electrode layer 111 includes two transparent electrode layers 111a disposed opposite to each other, and the liquid crystal layer 112 is located between the two transparent electrode layers 111a. In practical applications, one of the transparent electrode layers 111a may be grounded, and the other transparent electrode layer 111a may be connected to the power supply which is controlled by a controller, so as to receive a controlled driving voltage. When the controller 5 controls the power supply to supply the driving voltage to the driving electrode layer 111, vertical electric fields are generated between the two transparent electrode layers 111a, and keep the same at different positions, so as to adjust brightness of a displayed image seen by human eyes without affecting the content of the displayed image.

In the exemplary embodiments of the present disclosure, the transparent electrode layer 111a may use materials such as indium Tin Oxide (ITO) that is, the transparent electrode layer 111a may be made of ITO, and the transparent electrode layer 111a may be directly formed on the surface of the convex lens 12 during manufacturing. When the convex lens 12 is a plano-convex lens, the transparent electrode layer 111a may be directly formed on the flat surface of the plano-convex lens.

It should be noted that the driving electrode layers 111 may be disposed in other ways, for example, the two transparent electrode layers 111a of the driving electrode layer 111 are disposed on a same side of the liquid crystal layer 112, one of the transparent electrode layers 111a is provided as a strip electrode, and the other one of the transparent electrode layer 111a is provided as a planar electrode; alternatively, the driving electrode layer 111 is provided as a structure composed of a plurality of first electrode bars and a plurality of second electrode bars which are alternately disposed at intervals in addition, alignment layers may be further provided on both sides of the liquid crystal layer 112 to align the liquid crystal when the driving voltage is not applied to the driving electrode layer 111.

In order to ensure overall stability of the two convex lenses 12 and the light-transmissive layer 11, as shown in FIG. 4, the optical lens group 1 further includes a fixing member 13 surrounding the convex lens 12 along an edge of the convex lens 12, the fixing member 13 and the convex lens 12 may be of an integral structure, the two convex lenses 12 are provided with fixing members 13 at the edges of the convex lenses, and the two fixing members 13 are bonded with an adhesive 14, so as to stably connect the two convex lenses 12 and encapsulate the liquid crystal layer 112 between the two convex lenses 12. That is, each convex lens 12 is provided with a fixing member 13 at the edge of the convex lens, and the fixing member 13 corresponding to one convex lens 12 and the fixing member 13 corresponding to the other convex lens 12 are connected to each other to form the integrated optical lens group 1.

Figure 6:
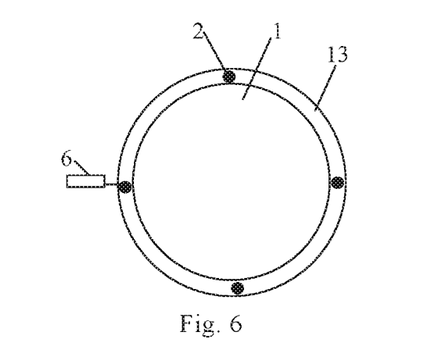
FIG. 6 is a schematic diagram illustrating a positional relation between an optical lens group, a fixing member, and photodetectors according to the exemplary embodiments of the present disclosure.

In order to improve accuracy of light intensity detection, as shown in FIG. 6, the optical lens group 1 is corresponding to a plurality of photodetectors 2, and the controller 5 acquires the light intensity detected by each photodetector 2 through a flexible circuit board 6, and takes an average of the light intensities detected by the plurality of photodetectors 2 as an actual light intensity. The plurality of photodetectors 2 corresponding to the optical lens group 1 are uniformly arranged around the convex lens 12 along the edge of the convex lens 12. Specifically, the photodetectors 2 may be disposed on the fixing member 13 at the edge of the convex lens 12.

In the exemplary embodiments of the present disclosure, as shown in FIG. 3, the number of the optical lens groups 1 is two, and each optical lens group 1 is corresponding to a plurality of photodetectors 2, that is, each optical lens group 1 is provided at the periphery thereof with a plurality of photodetectors 2 for detecting light intensity. It should be understood that it is possible that the plurality of photodetectors 2 surround the convex lens 12 of only one optical lens group 1 along the edge of the convex lens 12. That is, in the two optical lens groups 1, only one optical lens group 1 is provided at the periphery thereof with the plurality of photodetectors 2 for detecting light intensity, and no photodetector 2 is provided at the periphery of the other optical lens group 1. With this arrangement, it is possible to form a structure capable of realizing "detection on single eye, control on double eyes", that is, the light intensity at the periphery of only one optical lens group 1 corresponding to one eye is detected, and the controller 5 controls the light transmittances of the two optical lens groups 1 corresponding to two eyes according to the detected light intensity. With this structure, the number of the photodetectors 2 can be reduced, thereby reducing the cost.

In the exemplary embodiments of the present disclosure, one surface of the fixing member 13 may have a shape which matches the shape of the convex surface of the convex lens 12, and the fixing member 13 may be a flexible ring in order to protect the convex lens 12 from scratches. Of course, the form of the fixing member 13 is not limited thereto, for example, the fixing member 13 may be a rigid ring when there are high requirements for the fixing of the convex lens 12.

According to another aspect of the present disclosure, a near-eye display device is provided. The near-eye display device includes the above optical processing apparatus and the display panel 4, and as shown in FIG. 2a and FIG. 3, the display panel 4 is disposed on the light incident side of the optical lens group 1, The photodetector 2 is configured to detect the intensity of the light emitted from the display panel 4 to the optical lens group 1.

In the exemplary embodiments of the present disclosure, the optical processing apparatus is used in a head-mounted near-eye display device, and in such case, as shown in FIG. 2a and FIG. 3, the optical processing apparatus further includes a housing 3, and the housing 3 includes a side wall 34, and a first mounting portion 31 and a second mounting portion 32 which are provided on a side wall 34, the first mounting portion 31 may be connected to one end of the side wall 34, and the second mounting portion 32 may be connected to the other end of the side wall 34. The first mounting portion 31 surrounds the optical lens group 1 and faces the display panel 4, and the optical lens group 1 is fixedly connected to the first mounting portion 31. The photodetector 2 is disposed on a surface of the first mounting portion 31 facing the display panel 4, that is, on a side of the first mounting portion 31 facing the second mounting portion 32, so that the photodetector 2 is disposed inside the device without being contaminated by the outside, thereby greatly improving the detection accuracy of the photodetector 2, and reducing the maintenance times and cost of the photodetector 2. The second mounting portion 32 is configured to mount the display panel 4 of the near-eye display device on the light incident side of the optical lens group 1, and specifically, the display panel 4 is mounted by the second mounting portion 32 surrounding the display panel 4. It should be understood that, in the exemplary embodiment illustrated in FIG. 3, a plurality of photodetectors 2 are arranged on the first mounting portion 31 around the optical lens group 1 in a plane parallel to the display panel 4, so as to receive the light from the display panel 4 at good angles and detect the light intensity, which can improve the detection accuracy of the photodetectors 2, However, the positions of the photodetectors 2 are not limited to those on the first mounting portion 31, and may be arbitrarily arranged as required, and for example, the photodetectors 2 may be arranged on the side wall 34 for miniaturization of the first mounting portion 31.

In the exemplary embodiments of the present disclosure, the optical lens group 1 may be connected to the first mounting portion 31 through the fixing member 13 described above, and specifically, the fixing member 13 may be fixed to the first mounting portion 31 by bonding or by a connecting piece such as a screw, and thus the fixing member 13 integrated with the convex lens 12 is fixed to the first mounting portion 31. The fixing member 13 is located on a side of the first mounting portion 31 facing the display panel 4. When there are two optical lens groups 1, the first mounting portions 31 corresponding to the two optical lens groups 1 may be integrated, the integrated two first mounting portions 31 is equivalent to a plate-type structure provided with two openings, and each optical lens group 1 is corresponding to one opening. The second mounting portion 32 may be a clamp disposed on the side wall 34, and fixes the display panel 4 by clamping.

Of course, the mounting method of the optical lens group 1 and the display panel 4 on the housing 3 is not limited to the above methods, and other mounting methods may also be adopted, for example, the optical lens group 1 and the display panel 4 may be clamped tightly on the housing 3.

In order to prevent interference between images seen by both eyes of the user, as shown in FIG. 3, the housing 3 further includes a light shielding plate 33 disposed between the two optical lens groups 1, one end of the light shielding plate 33 is disposed on the first mount portion 31, and the other end of the light shielding plate 33 extends towards the display panel 4.

Specifically, as described above, the housing 3 includes the second mounting portion 32, and the display panel 4 is mounted on the second mounting portion 32. The optical lens group 1 is configured to converge the light from the display panel 4 to the viewing area va corresponding to the display panel 4, that is, the light emitted from the display panel 4 passes through the two optical lens groups 1 and then are converged to the two viewing areas va, so as to enable the human eyes in the viewing areas va to see an image.

In the exemplary embodiments of the present disclosure, the intensity of the light emitted from the optical lens group 1 to the light emitting side thereof is within a preset range, and the preset range may be determined according to the sensitivity of human eyes to light, so that the light with a light intensity within the preset range causes little stimulation to the human eyes when being irradiated to the human eyes, which makes the user feel comfortable. In this way, when the intensity of the light emitted from the display panel 4 to the optical lens group 1 is too large, the human eyes can be prevented from being strongly stimulated.

Figure 2C:
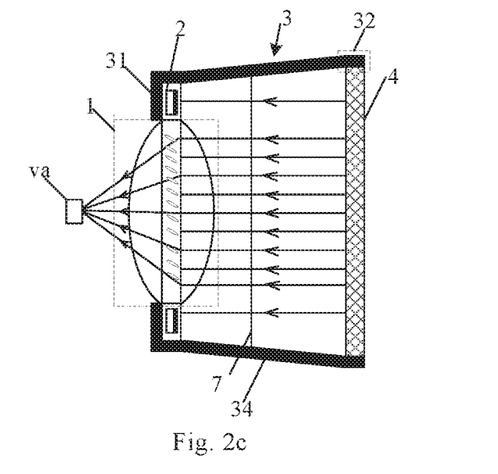

In the exemplary embodiments of the present disclosure, as shown in FIG. 2c, a filter 7 may be further disposed between the display panel 4 and the optical lens group 1. Specifically, the filter 7 is arranged in parallel to the display panel 4 and the optical lens group 1, and the outer periphery of the filter 7 is connected to the side wall 34 of the housing 3. Alternatively, the filter 7 may be adhered to a display screen of the display panel 4. By arranging the optical filter 7, various harmful light rays, particularly blue light rays, can be filtered out, and color contrast and vision clarity can be improved.

Figure 7:
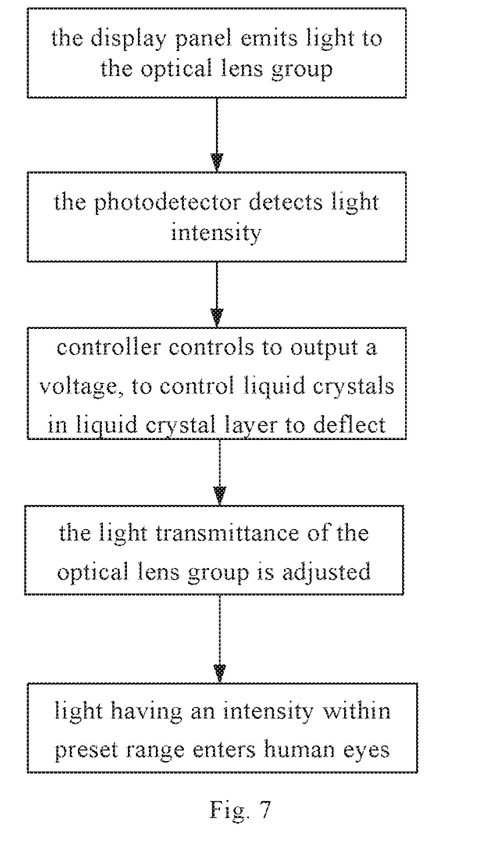
FIG. 7 is a schematic diagram illustrating a principle of light adjustment of a near-eye display in use according to the exemplary embodiments of the present disclosure.

The principle of light adjustment of the near-eye display device in use is illustrated in FIG. 7: firstly, the display panel emits light to the optical lens group; at the moment, the photodetector detects the light intensity and supplies the detected light intensity to the controller; and then, the controller controls the power supply to output a voltage, so as to control the liquid crystals in the liquid crystal layer to deflect, so that the light transmittance of the optical lens group is adjusted to allow the light with the intensity within a preset range to enter human eyes. The specific method and principle of determining the output voltage by the controller are described above and will not be described herein.

In the present disclosure, the controller can adjust the light transmittance of the optical lens group according to the light intensity detected by the photodetector, so that the intensity of the light emitted from the optical lens group to the viewing area is within the preset range. Therefore, when the intensity of the light emitted from the display panel to the optical lens group is too large, the controller can maintain the intensity of the light emitted from the optical lens group to the viewing area within the preset range suitable for human eyes by adjusting the light transmittance of the optical lens group, thereby protecting eyes and improving viewers' comfort. In addition, the optical lens group includes the light-transmissive layer and the convex lens, the light-transmissive layer includes the liquid crystal layer and the driving electrode layer, and the controller controls the deflection angle of the liquid crystal layer by controlling the power supply to supply the driving voltage to the driving electrode layer, thereby adjusting the overall light transmittance of the optical lens group. The method of adjusting the light transmittance through adjusting the driving voltage is more convenient and faster.

It should be understood that the above embodiments are merely exemplary embodiments employed to illustrate the principles of the present disclosure, and the present disclosure is not limited thereto. Those skilled in the art can make various changes and modifications without departing from the spirit and essence of the present disclosure, and those changes and modifications should be considered to fall within the scope of the present disclosure.

What is claimed is:

1. An optical processing apparatus, comprising:
   at least one optical lens group, light transmittance of which is adjustable;
   a photodetector configured to detect a light intensity of light emitted to the at least one optical lens group; and
   a controller configured to adjust the light transmittance of the at least one optical lens group according to the light intensity detected by the photodetector;
   wherein each of the at least one optical lens group comprises a light-transmissive layer, and one convex lens or a plurality of coaxially arranged convex lenses configured to converge light from a light incident side of the optical lens group, the light-transmissive layer covers the one convex lens or the plurality of coaxially arranged convex lenses in a direction of a main optical axis of the one convex lens or the plurality of coaxially arranged convex lenses, and light transmittance of the light-transmissive layer is adjustable;
   wherein the light-transmissive layer comprises a liquid crystal layer and a transparent driving electrode layer, and the controller is configured to control a power supply to supply a driving voltage to the driving electrode layer, so as to generate an electric field for driving liquid crystals in the liquid crystal layer to deflect; and
   when the liquid crystals in the liquid crystal layer do not deflect, and a long axis of the liquid crystals is perpendicular to the main optical axis of the one convex lens or the plurality of coaxially arrange convex lenses.

2. The optical processing apparatus according to claim 1, wherein the controller is configured to control the power supply to supply the driving electrode layer with the driving voltage corresponding to the light intensity detected by the photodetector according to a preset correspondence, the correspondence comprising a correspondence between different light intensities and corresponding driving voltages.

3. The optical processing apparatus according to claim 1, wherein the driving electrode layer comprises two transparent electrode layers disposed opposite to each other, and the liquid crystal layer is located between the two transparent electrode layers.

4. The optical processing apparatus according to claim 1, wherein each of the at least one optical lens group comprises two convex lenses, and the light-transmissive layer is disposed between the two convex lenses.

5. The optical processing apparatus according to claim 4, wherein the two convex lenses of each optical lens group are both plano-convex lenses, flat surfaces of which are attached to the light-transmissive layer.

6. The optical processing apparatus according to claim 5, wherein the light-transmissive layer comprises a liquid crystal layer and two transparent driving electrode layers sandwiching the liquid crystal layer, the driving electrode layers being made of indium tin oxide and formed on the flat surfaces of the plano-convex lenses.

7. The optical processing apparatus according to claim 4, wherein each of the convex lenses is provided at the edge thereof with a fixing member, and the fixing member corresponding to one convex lens and the fixing member corresponding to the other convex lens are connected to each other to form the optical lens group as a single piece.

8. The optical processing apparatus according to claim 7, comprising a plurality of photodetectors, which surround the convex lens along the edge thereof and are disposed on the fixing member.

9. The optical processing apparatus according to claim 8, wherein the number of the optical lens groups is two, and the plurality of photodetectors surround the convex lens of only one optical lens group along the edge of the convex lens.

10. A near-eye display device, comprising a display panel, and the optical processing apparatus according to claim 1, wherein the display panel is disposed on a light incident side of the optical lens group, and the photodetector is configured to detect the light intensity of the light emitted from the display panel to the optical lens group.

11. The near-eye display device according to claim 10, wherein the optical lens group is configured to converge the light from the display panel to a viewing area opposite to the display panel.

12. The near-eye display device according to claim 10, wherein the light intensity of the light emitted from the optical lens group to a light emitting side thereof is within a preset range.

13. The near-eye display device according to claim 10, further comprising a housing, which comprises a side wall; a first mounting portion that is connected to one end of the side wall, surrounds the optical lens group, and faces the display panel; and a second mounting portion that is connected to the other end of the side wall and surrounds the display panel.

14. The near-eye display device according to claim 13, wherein the photodetector is disposed on a surface of the first mounting portion facing the display panel.

15. The near-eye display device according to claim 13, wherein the optical lens group is connected to the first mounting portion through a fixing member.

16. The near-eye display device according to claim 13, wherein the display panel is disposed on the second mounting portion.

17. The near-eye display device according to claim 13, wherein the number of the optical lens groups is two, and the housing further comprises a light shielding plate disposed between the two optical lens groups.

18. The near-eye display device according to claim 14, wherein a plurality of photodetectors are arranged to surround the optical lens group in a plane parallel to the display panel.

* * * * *